United States Patent
Johnson et al.

[11] Patent Number: 5,928,346
[45] Date of Patent: Jul. 27, 1999

[54] METHOD FOR ENHANCED PERIPHERAL COMPONENT INTERCONNECT BUS SPLIT DATA TRANSFER

[75] Inventors: Leith L. Johnson; Richard Carlson, both of Fort Collins, Colo.

[73] Assignee: Hewlett-Packard Company, Palo Alto, Calif.

[21] Appl. No.: 08/873,348

[22] Filed: Jun. 11, 1997

Related U.S. Application Data

[62] Division of application No. 08/712,225, Sep. 11, 1996, Pat. No. 5,689,660.

[51] Int. Cl.$^6$ .................................................. G06F 13/00
[52] U.S. Cl. ........................................... 710/126; 710/112
[58] Field of Search ..................................... 395/292, 306

[56] References Cited

U.S. PATENT DOCUMENTS

| | | | |
|---|---|---|---|
| 4,785,394 | 11/1988 | Fischer | 364/200 |
| 4,947,368 | 8/1990 | Donaldson et al. | 364/900 |
| 5,121,487 | 6/1992 | Bechtolsheim | 395/325 |
| 5,191,581 | 3/1993 | Woodbury et al. | 370/85.9 |
| 5,191,649 | 3/1993 | Cadambi et al. | 395/200 |
| 5,239,638 | 8/1993 | Pawlowski et al. | 395/425 |
| 5,255,378 | 10/1993 | Crawford et al. | 395/325 |
| 5,305,436 | 4/1994 | Mundkur | 395/162 |
| 5,392,407 | 2/1995 | Heil et al. | 395/325 |
| 5,533,204 | 7/1996 | Tipley | 395/288 |
| 5,546,546 | 8/1996 | Bell et al. | 395/292 |
| 5,564,114 | 10/1996 | Popat et al. | 395/285 |
| 5,594,882 | 1/1997 | Bell | 395/421.02 |
| 5,621,897 | 4/1997 | Boury et al. | 395/296 |
| 5,708,794 | 1/1998 | Parks et al. | 395/481 |
| 5,761,444 | 6/1998 | Ajanovic et al. | 395/280 |
| 5,796,605 | 8/1998 | Hagersten | 394/200.83 |

OTHER PUBLICATIONS

PCI Local Bus Specification, Revision 2.0, PCI Special Interest Group, Apr. 30, 1993.

*Primary Examiner*—Ayaz R. Sheikh
*Assistant Examiner*—David A. Wiley

[57] ABSTRACT

A PC bus architecture that is compatible with an industry standard bus architecture and allows devices to transfer data more effeciently. The protocol of the present invention allows a data transaction in which a data transfer request can be made by a bus master device and then queued so that the transaction occurs at a later time allowing the bus to be free for other transactions until the responding device has prepared the data.

9 Claims, 9 Drawing Sheets

METHOD FOR ENHANCED PERIPHERAL COMPONENT INTERCONNECT BUS SPLIT DATA TRANSFER

CROSS REFERENCE TO RELATED APPLICATION

This is a divisional of application Ser. No. 08/712,225 filed on Aug. 11, 1996 now U.S. Pat. No. 5,689,660.

BACKGROUND OF THE INVENTION

1. Field of the Invention

The present invention relates, in general, to computer architecture and more particularly, to a computer architecture having an enhanced peripheral component interconnect (PCI) bus providing multiple speed data transfers using a single clock and having split transaction capability.

2. Statement of the Problem

Computer systems demand increasingly higher data transfer rates. For example, graphics oriented operating systems such as Windows and OS/2 require large amounts of data to be transferred between the central processing unit (CPU) and the devices that drive display devices such as a monitor. Even though CPU clock speeds have increased, conventional data bus architectures have created a data bottleneck between the CPU and these data intensive peripheral devices.

In conventional personal computer (PC) architectures, the CPU, main memory, and other peripheral input/output (I/O) devices are commonly coupled by a bus network having a local bus and a system bus. The system bus connects to the local bus and is generally slower than the local bus. Examples of common system bus architectures are the industry standard architecture (ISA), extended industry standard architecture (EISA) and the micro channel (MC) bus. The dual bus network evolved in part because early PCs required high speed data transfer only between the CPU and the main memory. Consequently, the CPU and the main memory are situated in the faster local bus, while the video subsystem as well as other peripheral I/O devices with varying clock speeds are usually connected to the slower system bus.

PCs have evolved to the point where high-speed data transfer is a critical factor in overall performance of the system. In particular, graphics intensive applications such as Computer Aided Design (CAD) require high-speed video devices that can drive high-resolution displays with more colors and three-dimensional capabilities. Video systems are being developed that require far more data transfer capability that current bus architectures and protocols can support.

Two bus architectures are currently available that allow high-speed devices to couple to the local bus to provide high data transfer rates between devices on the bus. The Video Electronics Standards Association (VESA) established a standard local bus that allowed some components, such as graphics cards, to interface directly with the local bus. In the VESA bus, the bus clock speed is controlled by the CPU clock speed. The Peripheral Component Interconnect (PCI) bus offers another architecture in which a bus controller sits between the CPU local bus and a device such as a graphics card. According to the PCI specification, a master device coupled to the PCI bus requests a data transaction with a specific target device, also coupled to the PCI bus. Both the master and target devices conduct the data transaction according to the PCI specified protocols. The PCI bus is not tied to the speed of the CPU, however, the PCI specification limits bus clock speed to 33 megahertz (MHz). In either the VESA bus or the PCI bus, data transfer occurs at most only once per clock cycle, thus the bus data transfer rate is limited to the bus clock speed, thereby limiting devices that are capable of and demand higher data transfer rates.

Another problem with the PCI bus architecture is that data transfers must occur immediately after a request is made. Often times a slow target device is unable to respond immediately. In accordance with the PCI bus specification, the bus is locked until the transaction between the master device and the slow target device is completed. Hence, the bus cannot support other data transactions until the slow device has responded. This slows overall speed and performance of the PC. A need exists in the PCI bus architecture for allowing data transactions to continue while a slow device prepares requested data.

Bus design and protocol is strictly regulated by industry standard specifications that dictate physical, mechanical, and electrical requirements for the bus. These specifications are necessary to ensure that devices from a wide variety of manufacturers can use the bus without negatively impacting other devices using the bus. One problem with industry standard specifications is that improvements to the bus architecture or protocol are difficult to implement. Hence, it is necessary that improvements to the protocol are compatible with existing protocol and devices that comply with the industry standard specification.

3. Solution to the Problem

The above identified problems are solved by a PC bus architecture that is compatible with an industry standard bus architecture and allows devices to transfer data at higher data rates than the bus clock speed. By transferring data more than once per clock cycle, the data transfer rate is multiplied. Another feature of the present invention is a protocol allowing a data transaction in which a data transfer request can be made by a bus master device and then queued so that the transaction occurs at a later time allowing the bus to be free for other transactions until the responding device has prepared the data.

SUMMARY OF THE INVENTION

The present invention involves a computer apparatus using a bus having a multiplexed address/data bus, a multiplexed control/byte enable bus, an interface control bus, and a clock line carrying a clock signal having first and second edges for each clock cycle. The bus normally transfers data on only one edge of the clock signal in each clock cycle. A master device is coupled to the bus. A normal target device capable of transferring data on only one edge of the clock signal is also coupled to the bus. A high speed target device capable of transferring data on both edges of the clock signal is also coupled to the bus.

The master device includes means for placing an address on the multiplexed address/data bus to identify a specific addressed target device, the addressed target device being one of the normal and high speed target devices. The addressing occurs during a first address phase. Means located in the master device indicates during the first address phase a request to transfer data on both edges of the clock signal. Means located in the normal target device responds to the this request by asserting a disconnect instruction on the interface control bus in response to request while means located in the master device determines if the addressed target device has asserted the disconnect instruction.

A first means located in the master device drives and accepts data from the data/address bus. A second means for driving and accepting data is located in the high speed target device. The first and second means for driving and accepting data are operable to transfer a first data word on the address/data bus during the first clock edge of a selected clock cycle and transfer a second data word on the multiplexed address/data bus during the second clock edge of the selected clock cycle.

Another aspect of the present invention involves a split data transaction that includes a first bus transaction initiated by a bus master device to request data, and a second bus transaction initiated by the target device to return the data. The master device can release control of the bus after completion of the request data command, freeing the bus for other data transactions. The return command can be initiated at a time after the target device has had time to prepare the requested data.

DETAILED DESCRIPTION OF THE DRAWING

1. Overview.

Although the present invention applies to a variety of bus configurations and modifications, a particular embodiment is described in reference to the peripheral component interconnect (PCI) revision 2.0 bus specification. The PCI specification applies to a bus for personal computers using microprocessors as a central processing unit. The PCI bus specification is independent of the microprocessor used and applies to all types of personal computer platforms including IBM, Macintosh, and the like.

Figure 1:
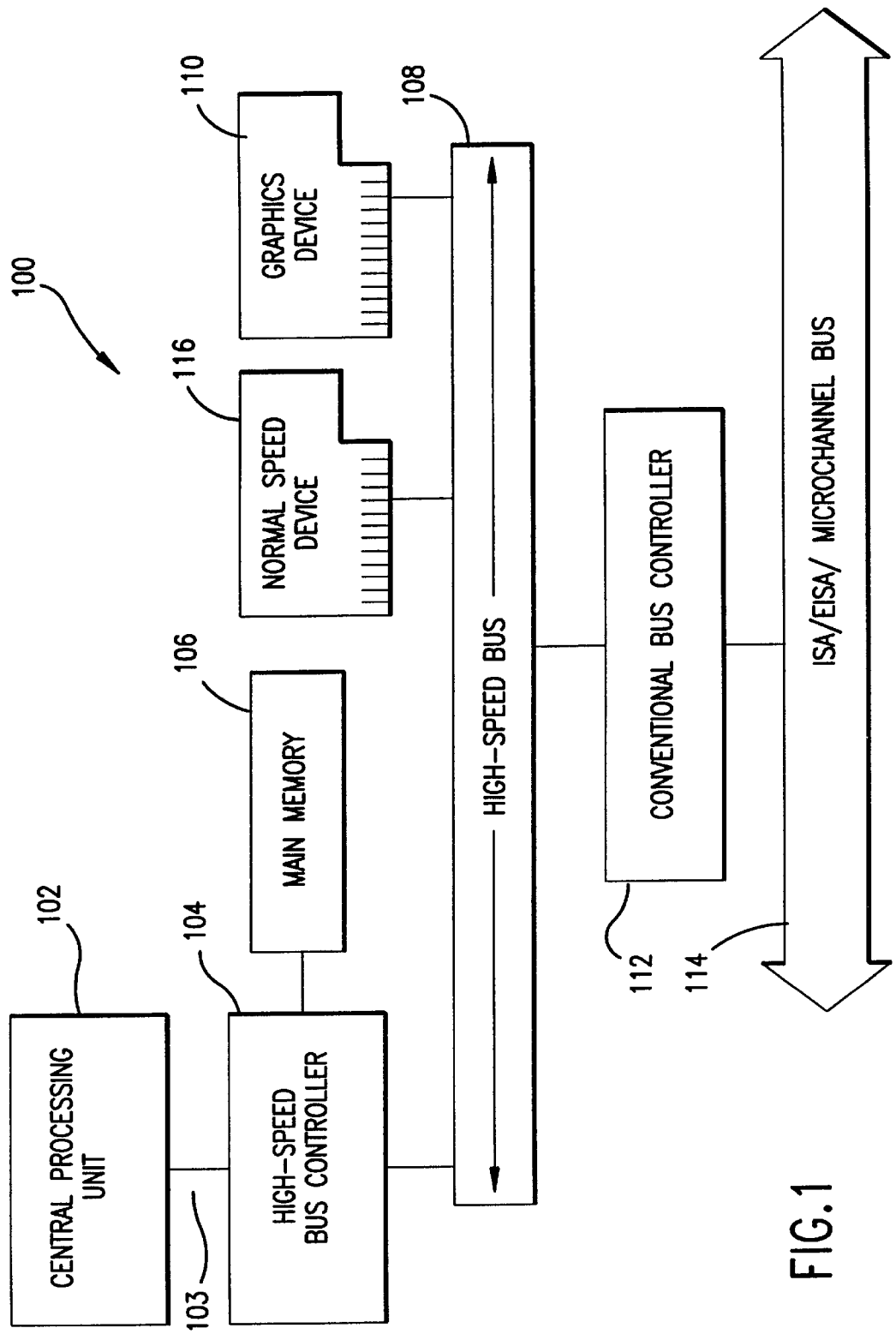
FIG. 1 illustrates a block diagram of a typical PCI bus architecture.

FIG. 1 illustrates in block diagram form a highly simplified diagram showing the interrelations of major components in a personal computer system. Central Processing Unit (CPU) 102 is essentially a microprocessor with associated circuitry for performing basic arithmetic, control and memory functions required in a personal computer. CPU 102 is coupled to high-speed bus controller 104. In the preferred embodiment high-speed bus controller 104 is an interface unit that complies with the PCI revision 2.0 specification.

The bus controller can be a separate circuit, or integrated with CPU 102. It should be noted that bus 103 coupling CPU 102 and high-speed bus controller 104 may be then high speed data bus operating at the clock speed of CPU 102. Bus 103 is what is commonly referred to as the "local bus". High-speed bus controller 104 is what is known as a "bridge" because it acts as an interface or bridge coupling high speed bus 108 to local bus 103. Importantly, all data transactions between CPU 102 and other peripheral devices such as graphics device 110, conventional bus controller 112, and normal speed device 116, must pass through high-speed bus controller 104.

Main memory 106 comprises one or more integrated circuits such as DRAM, SRAM or the like that provide temporary, user accessible memory for the personal computer. Main memory 106 is coupled either through high-speed bus controller 104, as shown in FIG. 1, or directly to local bus 103. Alternatively, main memory 106 may be formed in part or in whole integrally with CPU 102.

Bus 108 is a high speed data bus that in the preferred embodiment is a PCI-compliant bus. Bus 108 operates at a clock speed determined by high-speed bus controller 104 that is independent of the clock speed of CPU 102. Bus 108 has a specified physical length and layout to control electrical characteristics on the bus. Typically, high-speed bus controller 104 is coupled to one end of bus 108, although other couplings are possible. Various devices such as graphics device 110 and conventional bus controller 112 are coupled to bus 108 and interact with other devices coupled to bus 108 using the PCI specification protocol.

In accordance with the PCI specification, as well as other bus specifications, some of devices 104, 110, 112, and 116 coupled to bus 108 are master devices and others are designated target devices. Master devices contain extra circuitry to generate additional control signals that allow them to assert control of the bus during data transfers. Each computer system must have at least one master device. High-speed bus controller 104 will necessarily be a master device allowing the CPU 102 to control the bus and coordinate data transactions between the various peripheral devices.

Conventional bus controller 112 links high speed bus 108 to more conventional lower speed buses such as industry standard architecture (ISA), extended industry standard architecture (EISA), and a micro channel bus, as well as other conventional personal computer bus architectures. Conventional bus controller 112 is an example of a typical device that does not require high speed data transfer since the data traveling on conventional bus 114 is low speed.

Normal speed device 116 is a PCI-compliant device such as a disk controller, CD ROM drive controller, or the like that may be coupled to high speed bus 108. Presently, the PCI bus operates at 33 MHz so that only devices requiring high data transfer rates are coupled directly to high speed bus 108. Hence, normal speed device 116 actually supports high speed data transfer when compared to devices coupled to bus 114. However, the demands of new applications, particularly graphics applications, are not always satisfied even by the data transfer rate of a normal speed device 116 coupled directly to high speed bus 108. High speed devices, such as graphics device 110, modified in accordance with the present invention provide data transfer rates at approximately twice the rate of the normal speed device 116.

A typical bus data transaction occurs when a master device such as high-speed bus controller 104 asserts control over bus 108 using controller data lines (not shown) dedicated for that purpose. High-speed bus controller 104 will request to read data from or write data to a particular target device such as graphics device 110 or conventional bus controller 112. Graphics device 110, normal speed device 116, and conventional bus controller 112 have unique addresses assigned to them so that high-speed bus controller 104 can identify the particular device with which data transaction is required using an address. The data request occurs in a time period called a data phase that usually requires one clock period of the bus clock.

In a preferred embodiment, high-speed bus controller 104 is positioned at one terminal end of bus 108 while the high speed graphics device 110 is positioned at an opposite terminal end of bus 108. This orientation facilitates reflected wave signaling used in modern bus architectures such as the PCI bus. Reflected wave signaling means that the master device issues instructions and data at only one half the required signal amplitude onto bus 108. The signals travel the length of bus 108 to the terminal end (i.e., the right hand side of FIG. 1). At the terminal end, the signals are reflected and the reflected wave travels back towards the master device such as high-speed bus controller 104. The physical perimeters of bus 108 are such that the reflected wave interacts additively with the original wave hitting a pulse with the full required signal amplitude. Because the full signal amplitude only occurs after the reflection, the device located at the terminal end, such as graphics device 110, receives the signal first before any of the other devices coupled to bus 108. For this reason, it is preferable that any high speed target device such as graphics device 110 be located at a terminal end of bus 108.

Figure 2:
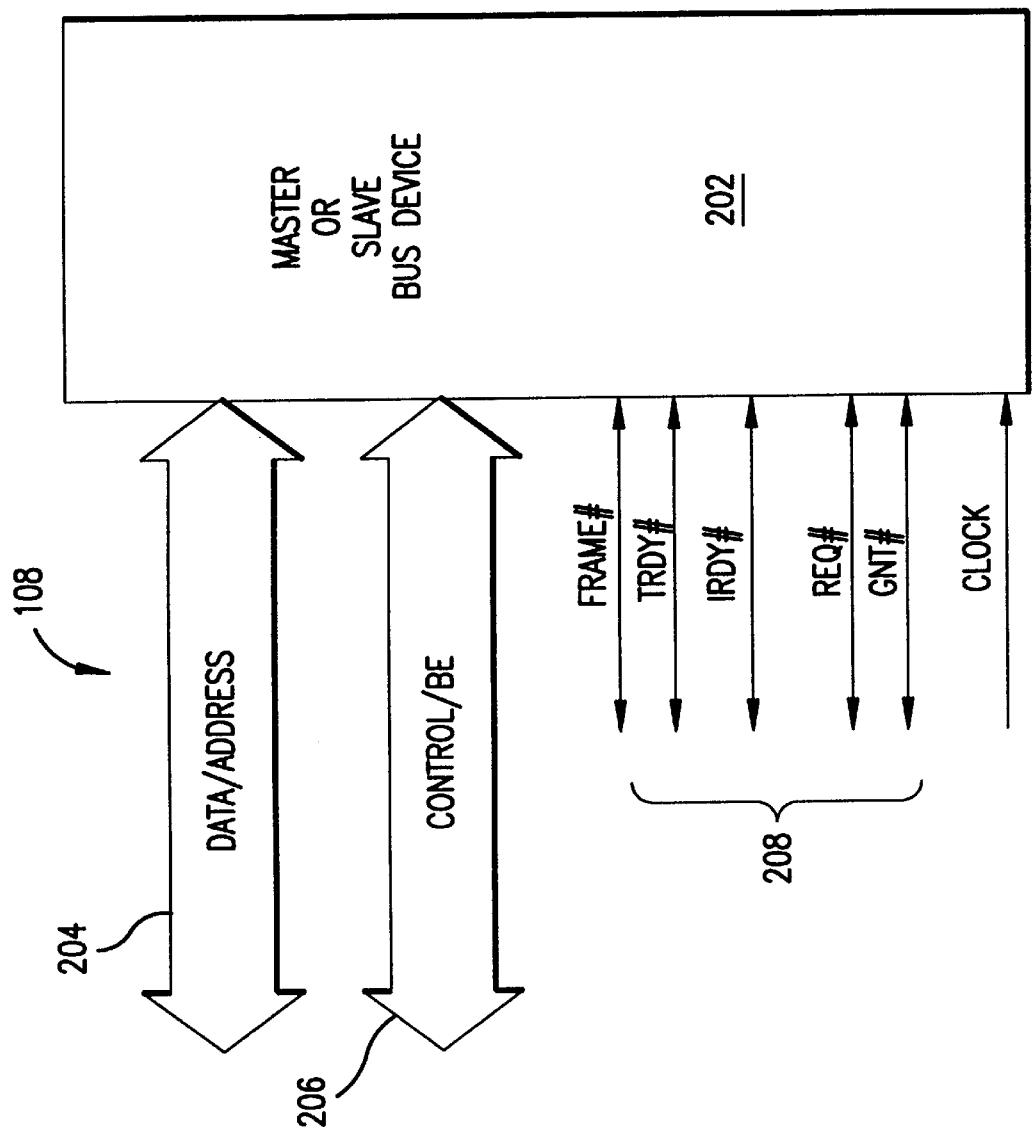
FIG. 2 illustrates a portion of the data and control lines that make up the industry standard PCI bus.

FIG. 2 illustrates some of the wires or lines in a high speed bus in accordance with the present invention. The bus illustrated in FIG. 2 is based upon the PCI bus, although some control and error processing lines that are not necessary for an understanding of the present invention are not illustrated. As noted before, an important feature of any improved bus protocol such as that of the present invention is that it work with the specified bus architecture and protocol without requiring additional lines or signals. Hence, the lines illustrated in FIG. 2 are identical to those used in a conventional bus, although through application of the present invention they operate differently and more efficiently.

As shown in FIG. 2, high-speed bus 108 comprises a data/address bus 204, a control/byte enable bus 206, and an interface control bus 208. Data/address bus 204 includes a plurality of lines that are multiplexed to serve as both address lines and to transfer data. The actual number of lines is determined by the bus specification or industry standard. For example, the PCI bus uses thirty-two or sixty-four lines in address/data bus 204.

Control/byte enable bus 206, labeled Control/BE in FIG. 2, comprises a number of lines used to send control information during the address phases and byte enable information during the data phase of a data transaction. The control information implements various pre-defined commands set out in the bus specification. For example, in the PCI bus the control/BE bus comprises four wires, allowing $2^4$ or sixteen unique commands to be transmitted. The commands define what type of data transaction is to occur.

Two important commands with respect to the present invention are the memory read command and the memory write command. In the PCI specification, a memory read command is used to read data from a target device mapped in the memory address space. A memory write command is used to write data to a target device mapped in the memory address space. Not all of the combinations are used for commands, however, allowing new commands to be defined as set out below in reference to the split data transaction feature of the present invention.

During data phases, which follow an address phase, the control/BE lines carry information as to which bytes of data in the transferred data are valid. In the PCI bus, for example, each data phase transfers any combination of four bytes of adjacent data even though some of those four bytes might not be enabled. The byte enable lines indicated which of the four bytes are valid.

The interface control bus comprises control lines that generally serve to assert and maintain control over the bus before and during a data transaction. FRAME# is used by a bus master device such as high-speed bus controller 104 in FIG. 1, to indicate the start and end of a data transaction. TRDY# is used by a target device such as normal speed device 116, conventional bus controller 112, or graphics device 110 in FIG. 1, to indicate it is ready to send or receive data and to allow them to force wait cycles. IRDY# is used by the master device to indicate it is ready to send or receive data and to allow it to force wait cycles.

REQ# and GNT# are used to negotiate for control of an idle bus. In prior PCI bus designs these features were available only in master devices. In accordance with the split data transaction feature of the present invention, non-master target devices are also enabled to take control of the bus using the REQ# signal to return requested data. Clock is a bus clock line that is provided by high speed bus controller 104 to all devices coupled to the bus. Only one clock signal is used in the bus, so that all data transactions occur relative to the signal on the Clock line. In the PCI specification, the clock signal has two edges per cycle, and data is transferred only on the rising edge of a clock cycle.

In accordance with the present invention, high-speed bus controller 104 and at least one device, such as graphics device 110, coupled to bus 108 are capable of transferring data at two times the bus clock speed. In conventional bus transfers, data is transferred on one edge of a clock signal. In accordance with the present invention, data is transferred on both edges of the clock signal between one master device, such as high-speed bus controller 104, and one high-speed target device, such as graphics device 110.

It should be understood that the structure shown in FIG. 1 and FIG. 2 is representative of a simple PC structure, and is not intended as a limitation to the teachings of the present invention. A variety of other architectures are known for interconnecting devices in a PC while the present invention relates primarily to a protocol and architecture for bus 108 that is completely compatible with the existing bus, yet allows devices to be modified to transfer data two times each clock cycle. Hence, the present invention involves a method and apparatus for improving data transfer rate.

Another feature of the present invention is called a split data transaction. By this, it is meant that a master device can initiate a data transaction with one device connected to bus 108, and then pause that transaction to free bus 108 for other transactions. This allows the transaction to be initiated and for the target device to take time to prepare the requested data without tying up bus 108.

For example, high-speed bus controller 104 can initiate a transaction with normal speed device 116. If the normal speed device 116 is unable to immediately respond, bus 108 is freed while normal-speed device 116 prepares the data. In the meantime, high-speed bus controller 104 can request a data transfer with graphics device 110 that may also be queued, or may be completed. Once bus 108 becomes idle again, normal speed device 116 detects the idle bus 108 and initiates return of the requested data from the earlier transaction request to high-speed bus controller 104.

It should be understood that the double speed transfer mechanism in accordance with the present invention and the split data transaction method in accordance with the present invention although complimentary, can be implemented separately as described hereinafter.

2. PCI Revision 2.0 Memory Read and Memory Write Transactions

Figure 3:
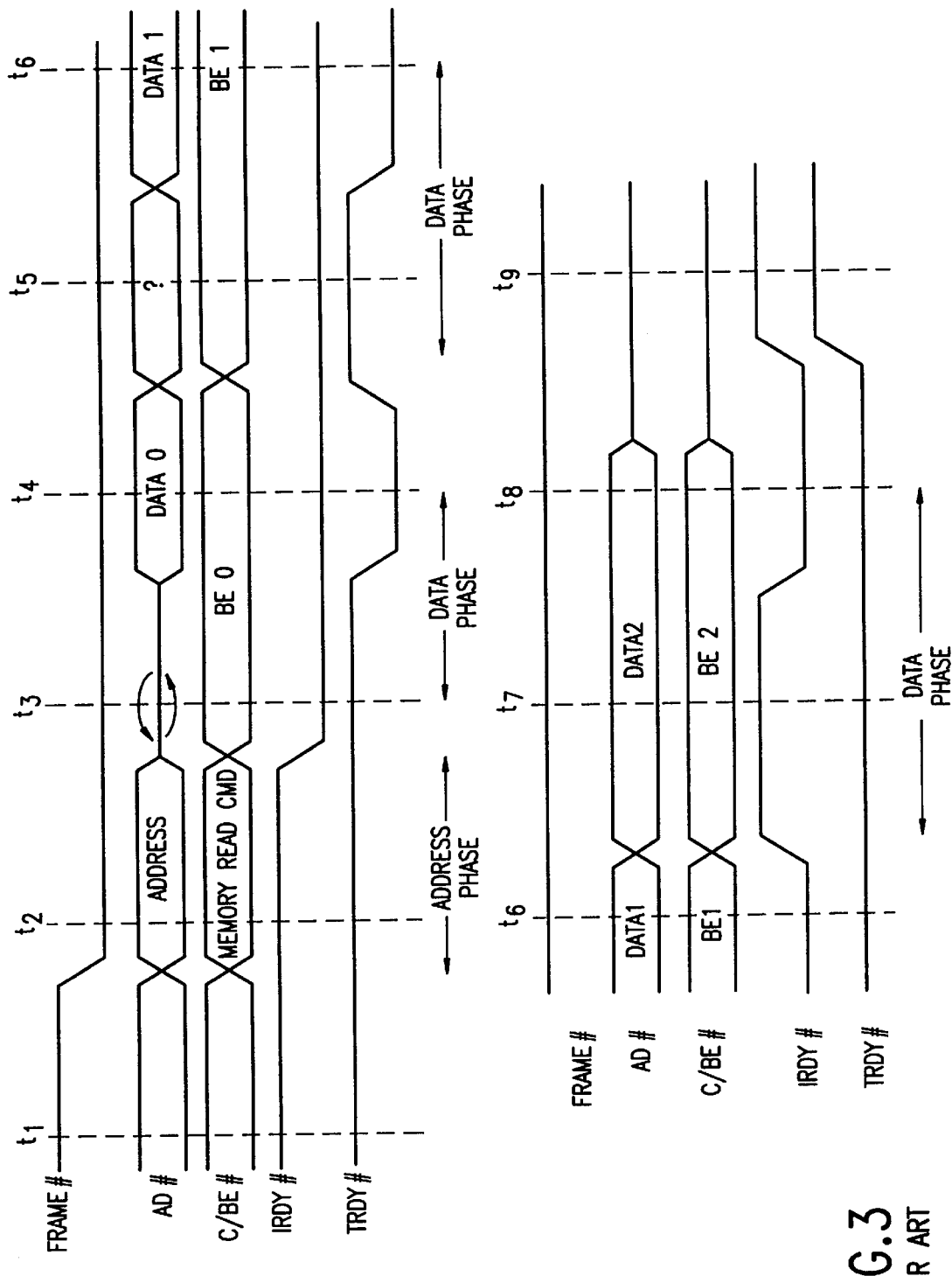
FIG. 3 shows a timing diagram for a prior art read transaction on the industry standard PCI bus.

FIG. 3 illustrates a memory read transaction in accordance with the PCI specification. In the preferred embodiment PCI bus implementation, the present invention applies to memory data transactions in which data is read from or written to a device mapped in the PC's main memory. Each target device is mapped into a defined range of memory addresses when the PC is turned on. The range of addresses assigned to a particular device may change during operation.

The thirty-two bit PCI data/address bus can access addresses from 00000000 to FFFFFFFF, expressed in hexadecimal. ordinarily, peripheral devices are mapped into a relatively small portion of memory at the high end of this range. During memory data transactions in the PCI bus, the two least significant address bits are not used as an address since the byte enables provide the equivalent information to the two least significant address bits. Standard PCI uses the extra two bits to indicate transfer burst ordering—the present invention uses an unallocated combination (e.g., binary 10). to indicate a double-speed transfer. Thus, each address uses only the thirty most significant bits, and cannot provide byte level resolution. Each address therefore is associated with four bytes of memory. These four bytes do not have to be consecutive (not all 4 bytes need be enabled), but for purposes of discussion it will be assumed that they are consecutive.

These four bytes form a "word" for data transaction purposes, and will be transferred together during a single data phase. To provide byte-level resolution, the byte enable control signals on the C/BE bus are used to indicate which of the four bytes in a transferred word are valid. For example, to access the address FFFFFFFF, an address of FFFFFFFC is generated, which is the highest address possible without the two least significant bits available. This address corresponds to a word consisting of the databytes at addresses FFFFFFFC, FFFFFFD, FFFFFFFE, and FFFFFFFF. The byte enable signals are used to indicate that only the fourth byte is valid data.

An address is called an odd address if it ends with an odd number 1, 3, 5, 7, 9, B, D, or F in hexadecimal. Otherwise, the address is an even address. The significance of odd and even addresses is relevant to the double speed data transfer protocol of the present invention and is described in greater detail hereinbelow.

The memory read transaction begins when FRAME# is asserted for the first time which occurs at $t_2$. In accordance with the PCI specification, all data transfers and transactions occur on the rising edge of the clock. During the address phase, the data/address lines labeled AD in FIG. 3 contain a valid address and the control/byte enable (C/BE) lines contain a valid bus command. The first rising edge of the first data occurs at $t_3$. During the data phase, C/BE indicate which bytes are involved in the current data phase. A data phase may consist of a data transfer and wait cycles. The C/BE# output buffers must remain enabled from the first clocks of the data phase to the end of the transaction. This ensures C/BE are not left floating for long intervals.

The first data phase on a read transaction requires a turnaround cycle indicated by the circular arrows in FIG. 3. The turnaround cycle is forced by the target via TRDY# signal and is essentially a forced wait cycle that prevents contention between multiple devices at the beginning of a data transaction. Although the turnaround cycles are shown in FIG. 3 for completeness, their implementation is not affected by the present invention.

In FIG. 3, the address is valid at $t_2$ at which time master device 104, shown in FIG. 1, stops driving AD. The earliest a target device can provide valid data is $t_4$. The target must drive the AD lines following the turnaround cycle. Once enabled, the output buffers of the target device must stay enabled through the end of the transaction. This ensures AD lines are not left floating for long intervals.

A data phase completes when data is transferred, which occurs when both IRDY# and TRDY# are asserted on the same clock edge. When either is deasserted a wait cycle occurs and no data is transferred. As shown in FIG. 3, data is successfully transferred at $t_4$, $t_6$, and $t_8$ and wait cycles are inserted times $t_3$, $t_5$, and $t_7$. The first data phase completes in a minimum time for a read transaction. A second data phase is extended by one clock cycle because TRDY# is deasserted at $t_5$. The last data phase is extended because IRDY# was deasserted at $t_7$.

Master device 104 knows at $t_7$ that the next data phase is the last. However, because master device 104 is not yet ready to complete the last transfer (IRDY# is de-asserted at $t_7$), FRAME# stays asserted. Only when IRDY# is asserted can FRAME# be deasserted, which occurs at $t_8$. When FRAME# is deasserted, the final data phase is completed and the master device releases control of the bus, moving the bus into an idle state. The idle state can be detected by other master devices and a new data transaction begun.

Figure 4:
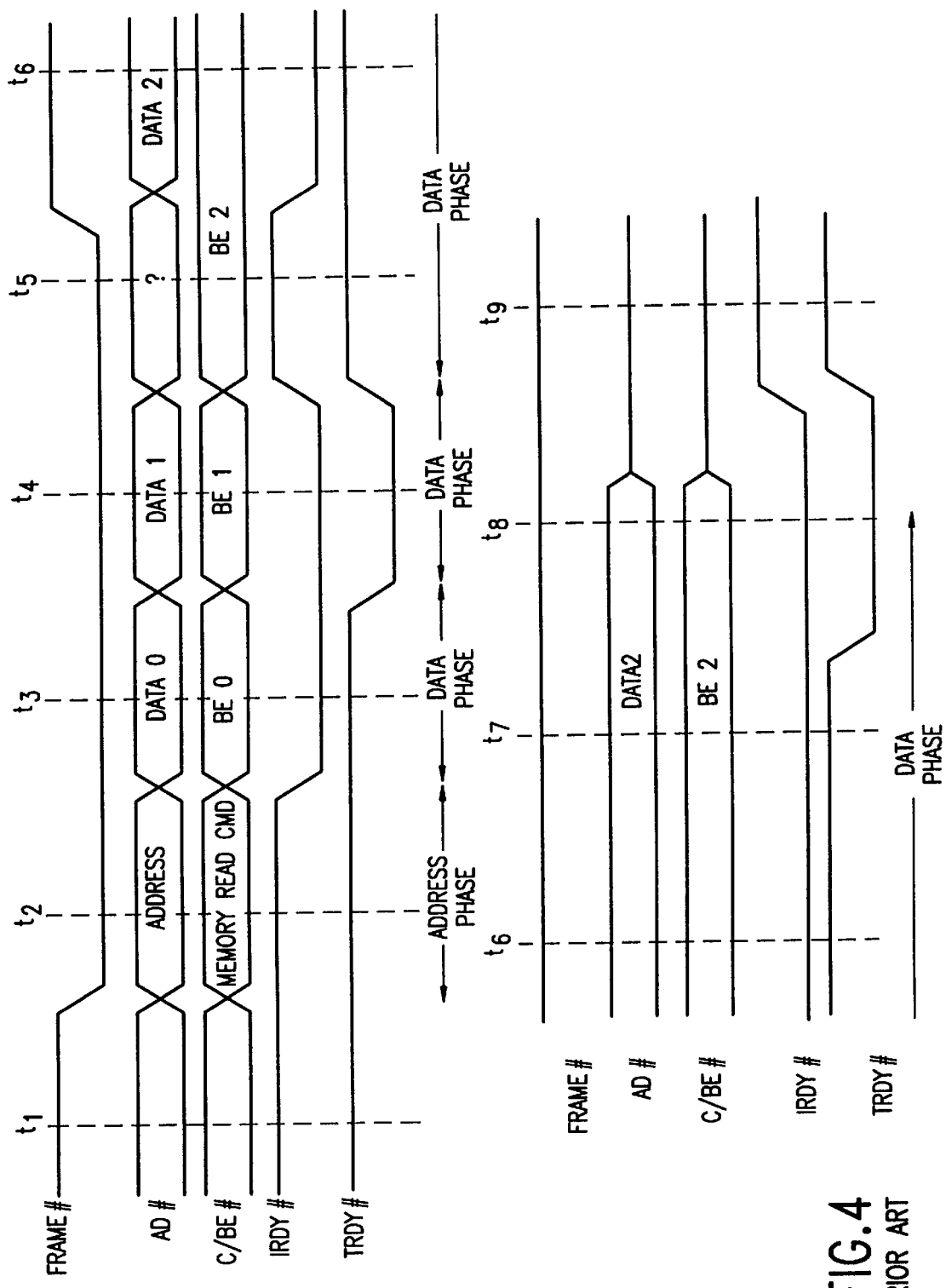
FIG. 4 shows a timing diagram for a prior art write transaction of the industry standard PCI bus.

FIG. 4 illustrates a prior art write transaction in accordance with the PCI specification. The transaction starts when FRAME# is asserted for the first time which occurs at $t_2$. A write transaction is similar to a read transaction except that no turnaround cycle is required following the address phase because master device 104 provides both address and data. Data phases work the same for both read and write transactions. That is to say, the data phases require that data is transferred once per clock cycle on the rising edge of the clock.

In FIG. 4, the first and second data phases complete with zero wait cycles. However, the third data phase has three consecutive wait cycles inserted by the target device time $t_5$, $t_6$, and $t_7$. Both master device at 104 and the target device insert a wait cycle at $t_5$. IRDY# must be asserted when FRAME# is deasserted indicating the last data phase.

The data transfer was delayed by master device 104 at $t_5$ because IRDY# was deasserted. Although this allowed master 104 to delay data, it did not allow the byte enables to be delayed. The last data phase is signaled by the master at $t_6$ by deasserting FRAME#, but does not complete until $t_8$.

A transaction on the prior art bus may be terminated by either master device 104 (also called the "host device") or one of the target devices. While neither can actually stop the transaction unilaterally, the master remains in ultimate control bringing all transactions to an orderly and systematic conclusion regardless of what the termination. All transactions are concluded when FRAME# and IRDY# are both deasserted indicating an idle bus. Specific protocols for master initiated termination and target initiated termination are provided in the PCI specification revision 2.0.

It should be understood that other signals are provided in common buses, including the PCI revision 2.0 bus. These signals provide various control functions, as well as regulating error reporting, arbitration, and system functions. These functions are not required for a clear understanding of the present invention, and so are not discussed further here. It is important to note, however, that implementation of the present invention would require compliance with the PCI specification.

3. Double Speed Data Transfer

Figure 5:
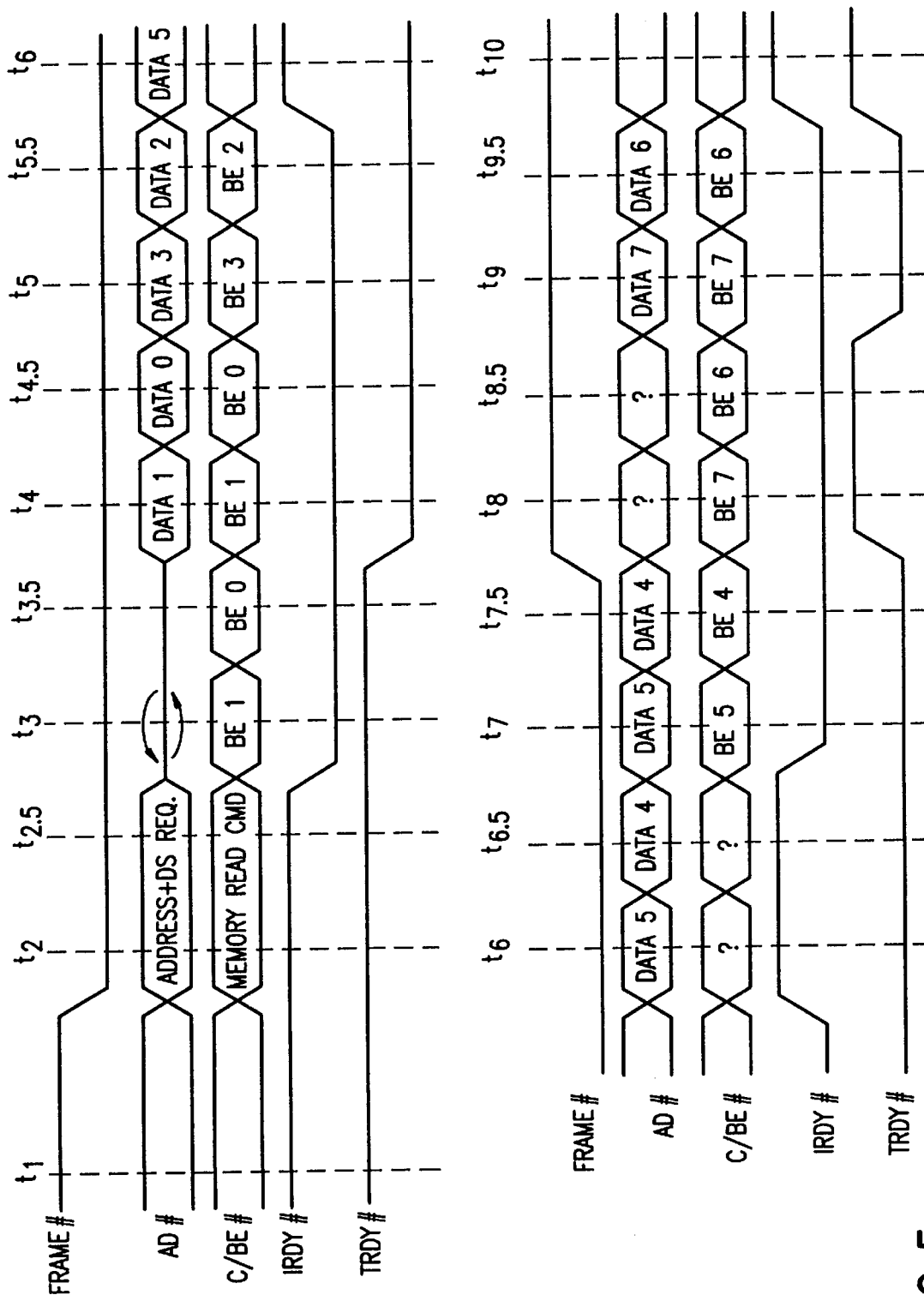
FIG. 5 shows a timing diagram for a read transaction in accordance with the present invention.
Figure 6:
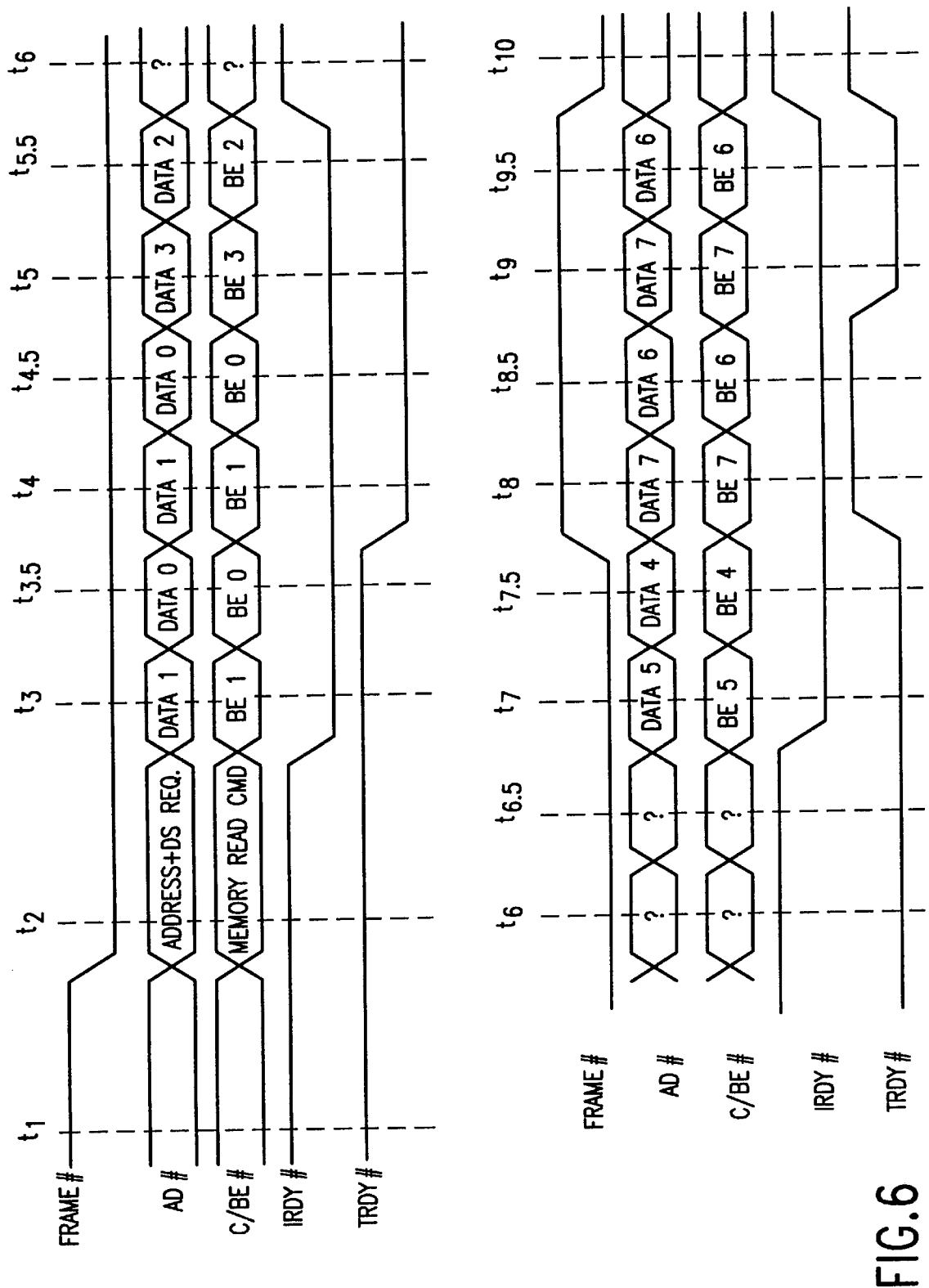
FIG. 6 shows a timing diagram for a write transaction in accordance with the present invention.

A protocol allowing data transfer twice per clock cycle on both the memory read and memory write transactions is illustrated in the timing diagrams of FIG. 5 and FIG. 6.

FIG. 5 illustrates a double speed memory read transaction in accordance present invention. The memory read transaction begins when FRAME# is asserted at $t_2$. During the address phase, which lasts from $t_2$ to $t_3$, the data/address lines labeled AD in FIG. 5 contain a valid address and the control/byte enable (C/BE) lines contain a valid memory read command as defined by the bus specification. In FIG. 5, the address is valid at $t_2$ at which time master device 104, shown in FIG. 1, stops driving AD.

As in the conventional PCI bus, the first data phase on a memory read transaction requires a turnaround cycle indicated by the circular arrows in FIG. 5. The earliest a target device can provide valid data is $t_4$. The target must drive the AD lines following the turnaround cycle. Once enabled, the output buffers of the target device must stay enabled through the end of the transaction to ensure the AD bus is not left floating for long intervals as in the conventional PCI bus specification.

The first rising edge of the first data phase occurs at $t_3$. During the data phase, C/BE indicate which bytes are involved in the current data phase using the binary codes BE1 and BE0. Unlike the standard PCI specification, two byte enable codes are provided for each data phase because two words of data are transferred at each clock cycle. Preferably, BE1, which is the byte enable code for the second word of data transferred, is placed on C/BE during the first clock edge. BE0, which is the byte enable code for the first word of data in the transaction, is placed on C/BE during the second clock edge of the first data phase.

A data phase completes when data is transferred, which occurs when both IRDY# and TRDY# are asserted on the same clock edge. In accordance with the present invention, the IRDY# and TRDY# protocol is not changed, and so they only take effect on the first clock edge of any clock cycle. As shown in FIG. 5, data is successfully transferred at $t_4$, $t_5$, $t_7$ and $t_9$. An important feature of the present invention is that a word of data is also transferred on the second edge of each clock cycle at times $t_{4.5}$, $t_{5.5}$, $t_{7.5}$ and $t_{9.5}$.

As in conventional bus transfers, a data phase may consist of a data transfer and wait cycles. A data phase at time $t_6$ must be repeated because IRDY# was deasserted at $t_6$. In this case, the byte enable signals are not available as indicated by the question marks in FIG. 5. It will be recalled that in the standard PCI protocol, the data phase is merely extended when a wait state occurs, but this is not adequate for the double speed transfer because both DATA 5 and DATA 4 must be provided once the wait state is completed. In other words, in accordance with the present invention, each data cycle is performed and repeated in pairs. Hence, the target device must provide DATA 5 and DATA 4, in that order, again rather than merely holding the AD bus at a constant state until the wait cycle(s) are complete. Similarly, a target initiated wait cycle at time $t_8$ prevents the transfer of data at time $t_8$ and time $t_{8.5}$, requiring master device 104 to re-send both BE 7 and BE 6, in that order, until the wait cycle is over.

Master device 104 knows at $t_8$ that the next data phase is the last. However, because graphics device 110 is not yet ready to complete the last transfer (TRDY# is deasserted at $t_8$), IRDY# stays asserted. When FRAME# is deasserted and the final data phase completed at time $t_{10}$, the master device releases control of the bus, moving the bus into an idle state. The idle state can be detected by other master devices and a new data transaction begun.

Because the present invention transfers two words of data in each clock cycle when operating in double speed mode, it is possible that a device will attempt read data from a memory address that is not allocated to that device. This could compromise memory integrity and should be prevented.

The first phase of a pair is always the higher, and is always an odd word address. Having the higher address at an odd word ensures that both words address the same device, and that the target device doesn't need to perform an addition or subtraction to generate the second address—both would be problems if, e.g., DATA 0 is at F0FFFFFC and DATA 1 is F1000000 (even though both are "valid" addresses). If a transfer begins at an odd word address, the first data state transfers only that one data word, similar to a standard PCI data transfer state. This ensures that all subsequent data states will be the proper odd/even word pairs.

When a transaction is ended at an even address, all byte enables in the first phase (i.e., the odd word) are deasserted so that the extra odd-address word has no effect. For example, if the data transaction should end at address F1000F0 (an even address) it is important that the corresponding odd address F10000F4 has no effect. This is accomplished by deasserting the byte enables in accordance with the present invention during the odd address portion of the transaction.

FIG. 6 illustrates a double speed write transaction in accordance with the present invention. The memory write transaction is essentially the same as a memory read transaction. However, the turnaround time at time $t_3$ is not needed because master device 104 provides both address and data as explained above in reference to the standard PCI bus. The transaction starts when FRAME# is asserted at $t_2$. Data phases work the same for both read and write transactions. That is to say, the data phases require that data is transferred on both clock edges of a clock cycle.

During the first data phase only, a disconnect issued by a normal speed target device, such as normal speed device 116 in FIG. 1, indicates the target device accepted only one word of data, even though master device 104 drove two words of data (DATA 1 and DATA 0). Master device 104 responds to this by initiating a normal speed data transfer beginning at the address DATA 1. At any subsequent data phase, the two words of data within one clock cycle are inseparable. They are both accepted when IRDY# and TRDY# are asserted at a clock edge, or are both re-broadcast when a wait cycle is inserted, or are both rejected if the target retries or aborts or disconnects the transfer with TRDY# deasserted.

In FIG. 6, the first data phase completes with one target-initiated wait cycle. As in the memory read transaction, the wait cycle causes both DATA 1 and DATA 0 to be repeated by master device 104 so that the two data words are presented in the proper order when the wait cycle is completed. Likewise, byte enable codes BE1 and BE0 are repeated until the wait cycle terminates and TRDY# is deasserted. Successful data transfers occur on at $t_4$, $t_{4.5}$, $t_5$, $t_{5.5}$, $t_7$, $t_{7.5}$, $t_9$ and $t_{9.5}$. Master device 104 inserts a wait cycle at $t_6$ because IRDY# is deasserted. The last data phase is signaled by the master at $t_8$ by deasserting FRAME#, but does not complete until tg when both IRDY# and TRDY# are deasserted. The memory write transaction is concluded when FRAME# and IRDY# are both deasserted indicating an idle bus.

As in the memory read transaction, the memory write transaction of the present invention transfers two words of data in each clock cycle when operating in double speed mode, hence it is possible that a device will attempt write data to a memory address that is not allocated to that device. This could compromise memory integrity and should be prevented. To avoid this situation, during the first data state is a single speed transfer if the transfer starts at an odd word address. This allows a single odd-address word to be transferred in the first data state and ensures that every subsequent double speed data phase will begin with a word at an odd address and end with the preceding word at an even address. Likewise, when a transaction is ended at an even address, all byte enables are deasserted in the odd phase so that the extra odd address word has no effect.

It should be understood that other signals are provided in common buses, including the PCI revision 2.0 bus. These signals provide various control functions, as well as regulating error reporting, arbitration, and system functions. These functions are not required for a clear understanding of the present invention, and so are not discussed further here. It is important to note, however, that implementation of the present invention would require compliance with the PCI specification.

4. Split Data Transfer

Another feature of the bus protocol in accordance with the present invention is an ability to allow split data transactions. A split data transaction is essentially a protocol allowing a master device to request a memory read data transaction where the actual data return occurs at a later time. This allows a slow target device to free the bus for other transactions while it prepares the requested data. The current PCI specification does not allow for split data transactions as taught by the present invention.

Figure 7:
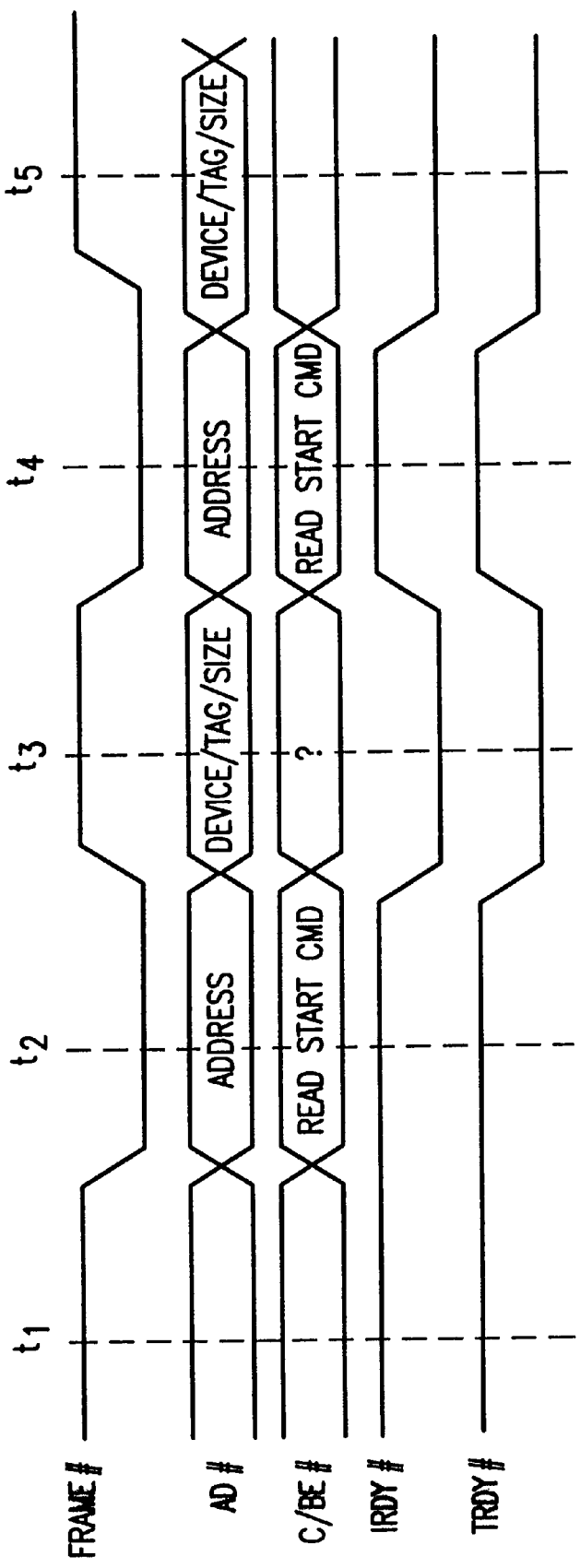
FIG. 7 illustrates a timing diagram for initiation of a split read transaction in accordance with the present invention.

FIG. 7 shows a timing diagram illustrating a SPLIT READ transaction in accordance with the present invention. Master device 104 to asserts control of high-speed data bus 108 and issues a READ START command on the control/byte enable bus during a first address phase. The READ START command is a new command defined to supplement the standard Memory Read command, binary code 0110, specified in the PCI specification. The READ START command of the present invention uses one of the reserved commands such as 0100, 0101, 1000, or 1001.

Master device 104 then places a beginning address on the AD bus during the first address phase, the beginning address associated with a first target device, such as normal speed target 116 coupled to high-speed bus 108 shown in FIG. 1. Master device 104 places a split read instruction on the AD bus during the first data phase following the first address phase. It is important to not confuse the SPLIT READ command, which is a four-bit binary code, with the split read instruction that uses the thirty-two or sixty-four bit wide AD bus.

The split read instruction comprises 1) a device identification for master device 104, 2) a tag identification to identify the transaction, and 3) a size instruction indicating how much data should be returned by the first target device. The device identification is a binary code that uniquely identifies master device 104 to distinguish it from other master devices (not shown) that may be coupled to high-speed bus 108. This acts much as an address that is associated with each target device coupled to bus 108. In the preferred embodiment, the device ID is a five-bit binary code.

The tag identification is a four-bit binary code that provides a unique identification of the data transaction. The device identification and tag identification are used when data is returned by a target device, as will be seen. Each master allocates its tags to ensure that each pending read issued by that master has a unique tag. The size instruction indicates the size of the returned data in bytes. The size identification is required because the return data transaction, described below, is directed by a target device rather than master device 104. The size instruction provides some means for a target device to terminate the return data transaction since termination is provided only by the master device in a conventional PCI protocol. Unlike the conventional memory read transaction that ties up the bus until the transaction is complete, the READ START command of the present invention allows the master device to release control of the PCI bus after the first data phase, allowing the bus to idle or conduct other transactions.

It should be noted the split data transaction is compatible with and can optionally be used in conjunction with the double speed transfer described above. This is accomplished by inserting the binary code 10 in the two least significant bits of the address during the READ START command.

The READ START command of the present invention must also be coupled with a RETURN command initiated by a target device to indicate when the target device is responding to the READ START command with the requested data. The RETURN command also uses a reserved binary code on control/byte enable bus 206. The RETURN data transaction is shown in the timing diagram of FIGS. 8a and 8b, and closely resembles the memory read transaction of FIG. 5, but is initiated by the target device.

The first target device detects when the bus is idle after control is released by the master device. The first target device assert control of the bus using the REQ# and GNT# lines ordinarily reserved for use only by master devices. Hence, target devices that support split transaction in accordance with the present invention preferably have PCI mastering capability. During an address phase after the target device has asserted control of the bus, it issues the RETURN command on C/BE#. While the RETURN command is asserted at $t_2$, the first target device places a return instruction on the AD bus during the address phase. The return instruction comprises 1) the device identification for the master device, 2) the first tag identification used in the split read instruction, and 3) an address instruction. The device identification and tag identification are copied from the split read instruction issued to the target device. The address instruction identifies which part of the requested data is being returned if, for any reason, the target cannot return all of the requested data at one time.

Figure 8A:
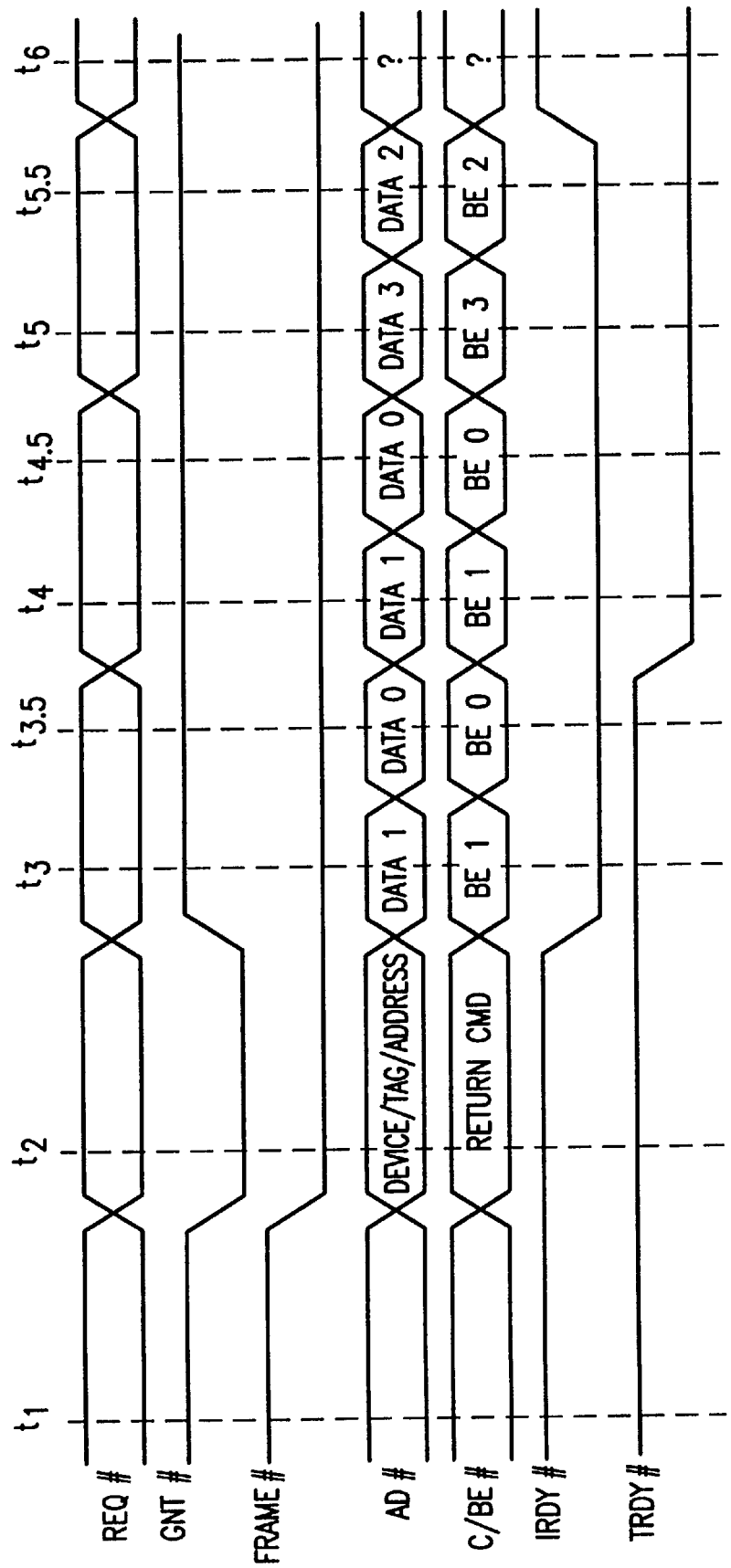
FIG. 8A and FIG. 8B show a timing diagram for a return transaction in the split read transaction in accordance with the present invention.
Figure 8B:
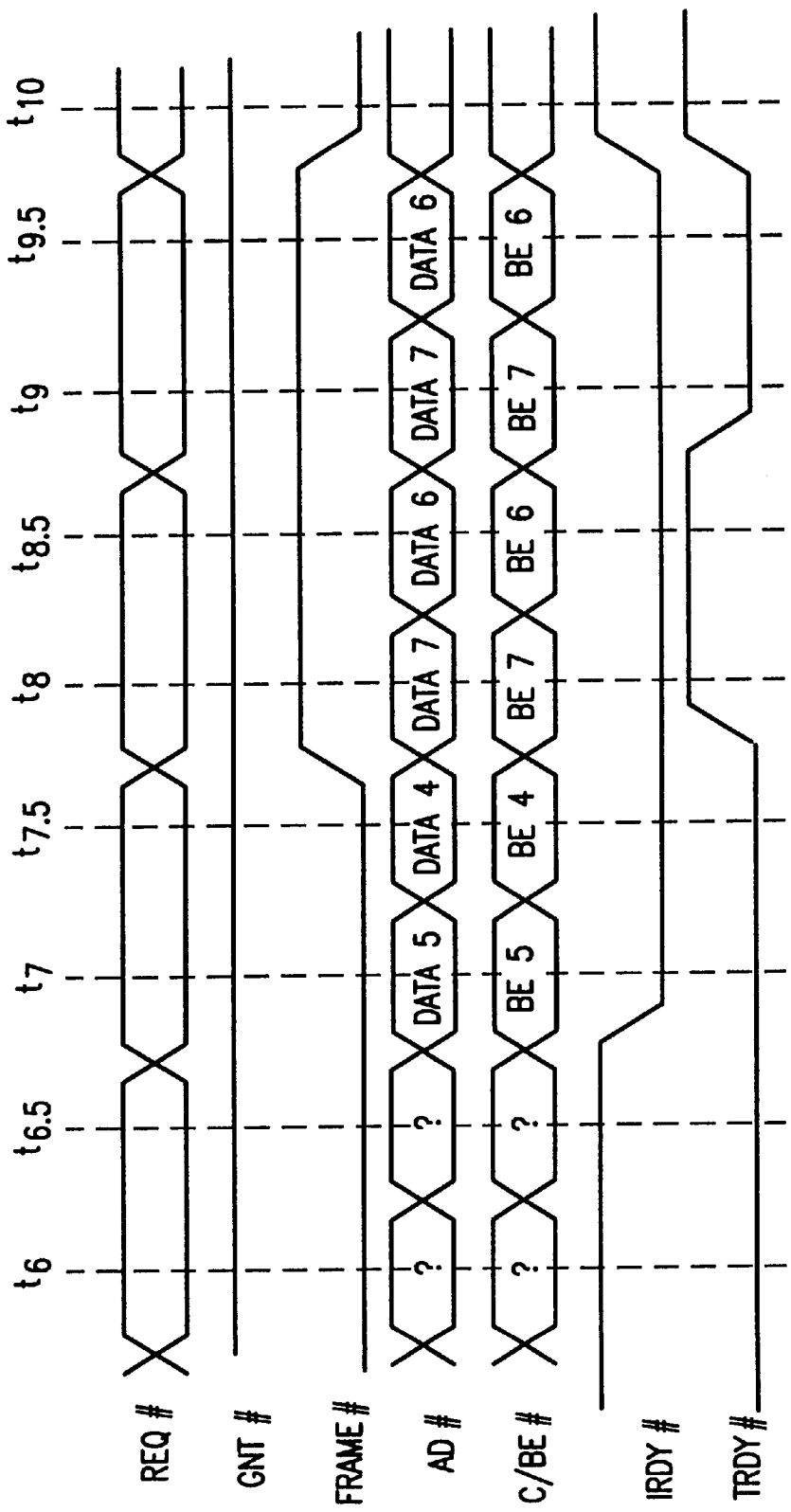

The target device returns data in at least one data phase following the second address phase. FIGS. 8a and 8b shows double speed transfers with two words transferred on each clock cycle. The data phases, including any target initiated or master initiated wait cycles, are the same as described hereinbefore with respect to the double speed return transaction in accordance with the present invention or a normal return transaction defined by the PCI specification, except that the byte enables will all be set during all data phases since only whole word data can be returned because the target device has no means to control the byte enable lines. The transaction is terminated by the target device using conventional target termination protocol.

Master device 104 may request multiple split data transactions all of which remain pending until a target device is able to return data. Likewise, any of a number of bus master devices may issue READ START commands that remain pending simultaneously. When a target device returns the requested data, master device 104 uses the device identification to determine if it is the data is intended for it, and uses the tag identification to determine where the data is coming from.

It is to be expressly understood that the claimed invention is not to be limited to the description of the preferred embodiment but encompasses other modifications and alterations within the scope and spirit of the inventive concept.

We claim:

1. In a computer having a master device, a peripheral component interconnect (PCI) bus connected to the master device, the PCI bus at least having an address/data (AD) bus and a control/byte enable (C/BE) bus, and a first target device coupled to the PCI bus, a method of transferring data comprising the steps of:

the master device asserting control of the PCI bus;

the master device issuing a first READ_START command on the CB/E bus during a first split read address phase;

the master device placing an address on the AD during the first split read address phase, the address associated with the first target device;

the master device placing a split read instruction on the AD bus during a first split read data phase following the first split read address phase, the split read instruction comprising 1) a device identification for the master device, 2) a first tag identification to identify a transaction, and 3) a size instruction indicating how much data should be returned by the first target device; and the master device releasing control of the PCI bus.

2. The method of claim 1 wherein the data transaction identified by the tag identification occurs only after the master device has released control of the PCI bus.

3. The method of claim 1 further comprising the steps of:

the first target device detecting when the PCI bus is idle after control is released by the master device;

the first target device asserting control of the PCI bus;

the first target device issuing a RETURN command on C/BE bus during a first read return address phase, the first read return address phase occurring after the first target device has asserted control of the PCI bus;

the first target device placing a return instruction on the AD bus during the first read return address phase, the return instruction comprising 1) the device identification for the master device, 2) the first tag identification used in the split read transaction, and 3) an address instruction; and the first target device delivering data in at least one data phase following the first read return address phase, the returning data associated with an address identified in the address instruction.

4. The method of claim 3 wherein the computer further comprises a second target device and the method further comprising the steps of:

the master device issuing a second READ_START command on the C/BE bus during a second split read address phase;

the master device placing a second address on the AD bus during the second split read address phase, the second address associated with the second target device; and the master device placing a split read instruction on the AD bus during a second split read data phase following the second split read address phase, the split read instruction comprising 1) a device identification for the master device, 2) a second tag identification to identify the transaction, and 3) a size instruction indicating how much data should be returned by the second target device.

5. In a computer having a master device, a peripheral component interconnect (PCI) bus connected to the master device, the PCI bus at least having an address/data (AD) bus and a control/byte enable (C/BE), and at least one target device coupled to the PCI bus, a method of transferring data comprising the steps of:

the master device asserting control of the PCI bus and during the time that the master device asserts control of the PCI bus, the master device further:
(a) issuing a read command on the C/BE bus during a split read address phase;
(b) placing an address identifying the at least one target device on the AD bus during the split read address phase; and
(c) placing a split read instruction on the AD bus during a split read data phase following the split read address phase, the split read instruction having at least the master device identification, wherein the split read instruction further comprises a transaction identification tag;

the master device deasserting control of the PCI bus;

the at least one target device asserting control of the PCI bus when the PCI bus is idle and after control is deasserted by the master device and during the time that the at least one target device asserts control, the at least one target device further:
(a) issuing a return command on the C/BE bus during a read return address phase;
(b) placing a return instruction on the AD bus during the read return address phase, the return instruction at least having the master device identification; and
(c) delivering data in at least one data phase following the read return address phase;

the at least one target device deasserting control of the PCI bus.

6. The method of claim 5 wherein the return instruction further comprises the transaction identification tag used in the split read instruction.

7. The method of claim 5 wherein the split read instruction further comprises a size instruction indicating how much data should be returned by the at least one target device.

8. The method of claim 5 wherein the return instruction further comprises an address instruction.

9. In a computer having a master device, a peripheral component interconnect (PCI) bus connected to the master device, the PCI bus at least having an address/data (AD) bus and a control/byte enable (C/BE), and at least one target device coupled to the PCI bus, a method of transferring data comprising the steps of:

the master device asserting control of the PCI bus and during the time that the master device asserts control of the PCI bus, the master device further:
(a) issuing a first READ_START command on the C/BE bus during a first split read address phase;
(b) placing an address on the AD bus during the first split read address phase, the address associated with the at least one target device; and
(c) placing a split read instruction on the AD bus during a first split read data phase following the first split read address phase, the split read instruction comprising 1) a device identification for the master device, 2) a first tag identification to identify a data transaction, and 3) a size instruction indicating how much data should be returned by the at least one target device;

the master device deasserting control of the PCI bus;

the at least one target device asserting control of the PCI bus when the PCI bus is idle and after control is deasserted by the master device and during the time that the at least one target device asserts control, the at least one target device further:

(a) issuing a RETURN command on C/BE bus during a first read return address phase;
(b) placing a return instruction on the AD bus during the first read return address phase, the return instruction comprising 1) the device identification for the master device, 2) the first tag identification used in the split read instruction, and 3) an address instruction; and
(c) delivering data in at least one data phase following the first read return address phase, the delivered data associated with an address identified in the address instruction;

the at least one target device deasserting control of the PCI bus.

* * * * *